United States Patent
Barabell et al.

(10) Patent No.: US 11,528,778 B2
(45) Date of Patent: Dec. 13, 2022

(54) BASEBAND CONTROLLER FOR CENTRALIZED RADIO ACCESS NETWORK (C-RAN) IMPLEMENTED USING HYBRID VIRTUALIZATION ARCHITECTURE

(71) Applicant: CommScope Technologies LLC, Hickory, NC (US)

(72) Inventors: Arthur J. Barabell, Sudbury, MA (US); Luigi Tarlazzi, Boxborough, MA (US); Anil Bapat, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/810,407

(22) Filed: Mar. 5, 2020

(65) Prior Publication Data
US 2020/0296799 A1    Sep. 17, 2020

Related U.S. Application Data

(60) Provisional application No. 62/850,311, filed on May 20, 2019.

(30) Foreign Application Priority Data

Mar. 7, 2019  (IN) .............................. 201911008981

(51) Int. Cl.
*H04W 88/06* (2009.01)
*H04W 88/08* (2009.01)
(Continued)

(52) U.S. Cl.
CPC ......... *H04W 88/085* (2013.01); *H04W 24/02* (2013.01); *H04W 48/16* (2013.01); *H04W 48/18* (2013.01); *H04W 88/06* (2013.01)

(58) Field of Classification Search
CPC ... H04W 88/085; H04W 88/06; H04W 24/02; H04W 48/18; H04W 48/16; H04W 76/15; H04W 92/12
See application file for complete search history.

(56) References Cited

U.S. PATENT DOCUMENTS

2018/0279376 A1 * 9/2018 Dinan .................. H04W 52/50
2018/0332614 A1 * 11/2018 Shanmugaraju ...... H04W 76/27
(Continued)

FOREIGN PATENT DOCUMENTS

EP    3163974 A1    5/2017
WO   0068698 A1    11/2000
(Continued)

OTHER PUBLICATIONS

International Searching Authority, "International Search Report and Written Opinion from PCT Application No. PCT/US2020/021193", from Foreign Counterpart to U.S. Appl. No. 16/810,407, dated Jun. 24, 2020, pp. 1 through 12, Published: WO.

(Continued)

*Primary Examiner* — Julio R Perez
(74) *Attorney, Agent, or Firm* — Fogg & Powers LLC

(57) ABSTRACT

One embodiment is directed to a baseband controller for use with a plurality of radio points to provide wireless service to user equipment (UE) using a wireless interface. The baseband controller makes use of a hybrid virtualized architecture comprising special-purpose hardware configured to implement at least some of the LAYER-1 functions for the wireless interface and a virtual platform configured to implement some of the functions for the wireless interface. Such a baseband controller can be used in dual connectivity radio access networks.

23 Claims, 11 Drawing Sheets

(51) Int. Cl.
*H04W 24/02* (2009.01)
*H04W 48/18* (2009.01)
*H04W 48/16* (2009.01)

(56) References Cited

U.S. PATENT DOCUMENTS

| | | | |
|---|---|---|---|
| 2018/0368109 A1* | 12/2018 | Kim | H04W 72/04 |
| 2019/0132790 A1* | 5/2019 | Lee | H04W 48/18 |
| 2019/0158360 A1* | 5/2019 | Xu | H04W 36/08 |
| 2019/0159274 A1* | 5/2019 | Hong | H04W 28/085 |
| 2019/0166526 A1* | 5/2019 | Xu | H04W 92/20 |
| 2019/0166527 A1* | 5/2019 | Oketani | H04B 7/0695 |
| 2019/0174346 A1* | 6/2019 | Murray | H04B 7/0408 |
| 2019/0215055 A1* | 7/2019 | Majmundar | H04B 7/15521 |
| 2020/0187021 A1* | 6/2020 | Shanmugaraju | G06N 3/08 |
| 2020/0296799 A1* | 9/2020 | Barabell | H04W 24/02 |
| 2021/0007039 A1* | 1/2021 | Salahuddeen | H04L 5/0048 |
| 2021/0195541 A1* | 6/2021 | Wei | H04W 80/02 |

FOREIGN PATENT DOCUMENTS

| | | | | |
|---|---|---|---|---|
| WO | 2015169370 | A1 | 11/2015 | |
| WO | 2018009340 | A1 | 1/2018 | |
| WO | 2018128022 | A1 | 7/2018 | |
| WO | WO-2018200570 | A1 * | 11/2018 | G06F 9/45558 |

OTHER PUBLICATIONS

NGMN "NGMN RAN functional split and x-haul" work item, NGMN, Feb. 26, 2018, pp. 1 through 3, 3GPP TSG SA WG5 (Telecom Management) Meeting #118, Apr. 2018, Beijing, China.
Fluke Networks, "Will My Existing Cable Plant Support 2.5/5GBASE-T?", Jan. 17, 2018, pp. 1-4, Fluke Networks.
European Patent Office, "Extended European Search Report from EP Application No. 20766889.8", from Foreign Counterpart to U.S. Appl. No. 16/810,407, dated Oct. 28, 2022, pp. 1 through 14, Published: EP.

* cited by examiner

BASEBAND CONTROLLER FOR CENTRALIZED RADIO ACCESS NETWORK (C-RAN) IMPLEMENTED USING HYBRID VIRTUALIZATION ARCHITECTURE

CROSS-REFERENCE TO RELATED APPLICATIONS

This application claims priority to Indian provisional patent application No. 201911008981, filed Mar. 7, 2019, which is hereby incorporated herein by reference in its entirety.

This application also claims the benefit of U.S. Provisional Patent Application Ser. No. 62/850,311, filed on May 20, 2019, which is hereby incorporated herein by reference in its entirety.

BACKGROUND

A centralized radio access network (C-RAN) can be used to implement base station functionality for providing wireless service to various items of user equipment (UE). Typically, for each cell implemented by the C-RAN, one or more baseband units (BBUs) (also referred to here as "baseband controllers" or simply "controllers") interact with multiple remote units (also referred to here as "radio points" or "RPs"). Each baseband controller is coupled to the radio points over front-haul communication links or a front-haul network.

One conventional approach to implementing a baseband controller employs special-purpose hardware. One example of implementing a baseband controller 100 using special-purpose hardware is shown in FIG. 1. In this example, the baseband controller 100 is used for providing wireless service to user equipment using a Long-Term Evolution (LTE) wireless interface.

In the example shown in FIG. 1, the special-purpose hardware comprises a system on a chip (SoC) 102. In this example, the SoC 102 comprises a multi-core general purpose processor, a multi-core digital signal processor (DSP), and application-specific hardware accelerators for certain LTE L1 functions.

FIG. 1 illustrates the functional partitioning of the baseband controller functionality and mapping to the various subsystems of the SoC 102.

As shown in FIG. 1, the baseband controller functionality is partitioned into LTE LAYER-3 Control Plane functions 104, LTE LAYER-2 Control Plane functions 108, less-time-critical LTE LAYER-2 User Plane functions 106, time-critical LTE LAYER-2 User Plane functions 110, and the LTE LAYER-1 functions 112 implemented in the baseband controller 100 (also referred to here as the "upper LAYER-1 functions 112").

Also, in the exemplary embodiment shown in FIG. 1, the baseband controller 100 further comprises a timing system 114 that is used to synchronize the other nodes in the C-RAN to a master clock. In the exemplary embodiment shown in FIG. 1, the timing system 114 implements the Precision Time Protocol (PTP).

The baseband controller 100 communicate with the wireless service provider's Evolved Packet Core (EPC) 128 using the LTE S1-C and LTE S1-U interfaces, respectively. In FIG. 1, control plane communications are illustrated using dashed lines and user plane communications are illustrated using solid lines.

The LTE LAYER-3 Control Plane functions 104, in this example, include the LTE Radio Resource Management (RRM) functions 116, LTE Radio Resource Control (RRC) functions 118, LTE Self-Organizing Network (SON) functions 120, and LTE Cell Management functions 122.

The LTE LAYER-2 Control Plane functions 108, in this example, include the LTE Media Access Control (MAC) scheduler ecosystem 130. The less-time-critical LTE LAYER-2 User Plane functions 106, in this example, include the LTE Packet Data Convergence Protocol (PDCP) functions 124. The time-critical LTE LAYER-2 User Plane functions 110, in this example, include the LTE Radio Link Control (RLC) functions 132 and LTE MAC functions 134.

The LTE LAYER-3 Control Plane functions 104, LTE LAYER-2 Control Plane functions 108, less-time-critical LTE LAYER-2 User Plane functions 106, and time-critical LTE LAYER-2 User Plane functions 110 are mapped to the general-purpose processor of the SoC 102 and are implemented in software that is executed by the general-purpose processor of the SoC 102. Also, in this exemplary embodiment, the timing system 114 is mapped to the general-purpose processor of the SoC 102 and is implemented in software that is executed by the general-purpose processor of the SoC 102.

The upper LTE LAYER-1 functions 112 are mapped to the DSP and the application-specific hardware accelerators of the SoC 102, with some of the upper LTE LAYER-1 functions 112 implemented in software that is executed by the DSP and some of the upper LTE LAYER-1 functions 112 (for example, encoding and decoding) implemented using the application-specific hardware accelerators (under control of the DSP software).

The baseband controller 100 also comprise one or network interfaces (not shown) that couple the baseband controller 100 to the front-haul network or communication links used for communicating with the radio points. For example, where the front-haul network is implemented using a switched ETHERNET network, the baseband controller 100 comprises one or more ETHERNET network interfaces for communicating over the front-haul switched ETHERNET network.

In practice, as the number of users served by the baseband controller 100 increases, the general-purpose processor of the SoC 102 can become the bottleneck—both with respect to the control plane functions (in particular, the MAC scheduling functions) and user plane functions. Scaling a baseband controller 100 implemented using special-purpose hardware typically involves migrating the baseband controller 100 to a more powerful version of the special-purpose hardware. This approach, however, depends on proprietary hardware and the vendors that supply it providing the more powerful version of the special-purpose hardware when needed. Also, generally, solutions based on proprietary special-purpose hardware typically do not benefit from the economies of scale and faster improvements in processing power experienced by less-specialized, general-purpose platforms.

SUMMARY

One embodiment is directed to a baseband controller for use with a plurality of radio points to provide wireless service to user equipment (UE) using a wireless interface. The baseband controller comprises special-purpose hardware configured to implement at least some of the LAYER-1 functions for the wireless interface and a virtual platform configured to implement some of the functions for the wireless interface.

Another embodiment is directed to a system comprising a baseband controller to communicatively couple to a core network and a plurality of radio points to wirelessly transmit and receive radio frequency signals to and from the user equipment using the wireless interface. Each of the radio points is associated with at least one antenna and is located remote from the controller. The baseband controller comprises special-purpose hardware configured to implement at least some of the LAYER-1 functions for the wireless interface and a virtual platform configured to implement some of the functions for the wireless interface.

Other embodiments are disclosed.

The details of various embodiments are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 2:
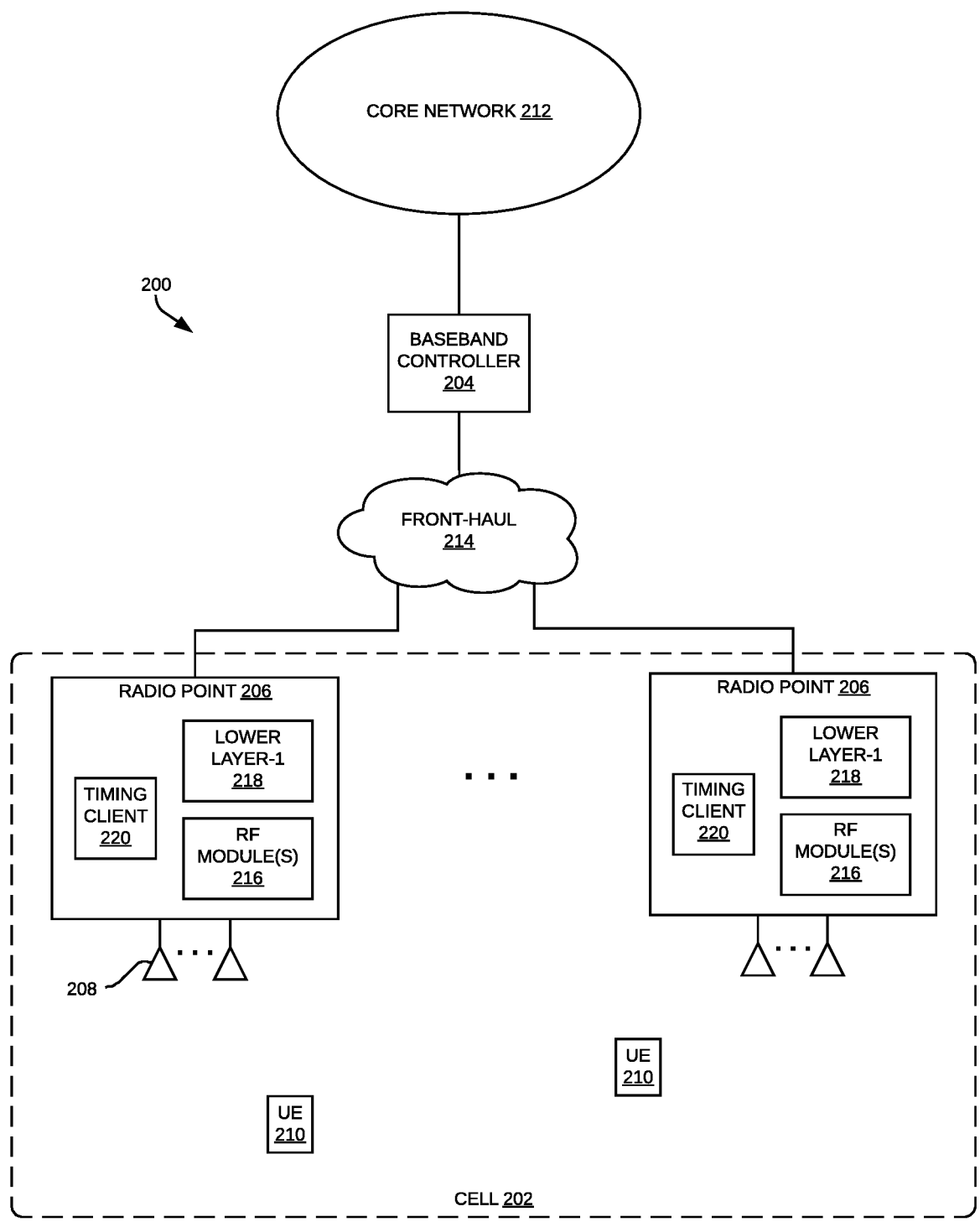
FIG. 2 is a block diagram one embodiment of a C-RAN in which the various baseband controller implementation scenarios described below can be implemented.

FIG. 2 is a block diagram one embodiment of a C-RAN 200 in which the various baseband controller implementation scenarios described below can be implemented.

The C-RAN 200 (also referred to here as a "C-RAN system" 200 or just "system" 200) comprises, for each cell 202 served by the C-RAN 200, a baseband controller 204 and multiple radio points (RPs) 206. Each RP 206 is remotely located from the baseband unit 204. Also, in this exemplary embodiment, at least one of the RPs 206 is remotely located from at least one other RP 206. Each RP 206 includes or is coupled to one or more antennas 208 via which downlink RF signals are radiated to various items of user equipment (UE) 210 and via which uplink RF signals transmitted by UEs 210 are received.

The system 200 is coupled to a core network 212 of the associated wireless network operator over an appropriate back-haul. Also, each baseband controller 204 is communicatively coupled to the radio points 206 served by it using a front-haul network 214. The baseband controllers 204 and the radio points 206 include one or more network interfaces (not shown) in order to enable the baseband controllers 204 and radio points 206 to communicate over the front-haul network 214.

In one implementation, the front-haul 214 that communicatively couples each baseband controller 204 to the RPs 206 is implemented using a switched ETHERNET network. In such an implementation, each of baseband controller 204 and radio point 206 includes one or more ETHERNET interfaces for communicating over the switched ETHERNET network used for the front-haul 214. However, it is to be understood that the front-haul between each baseband controller 204 and the RPs 206 served by it can be implemented in other ways.

Generally, for each cell 202 implemented by the C-RAN 200, the corresponding based controller 204 serving the cell 202 performs the LAYER-3 and LAYER-2 functions for the particular wireless interface used for that cell 202. Also, for each cell 202 implemented by the C-RAN 200, the corresponding based controller 204 serving the cell 202 performs some of the LAYER-1 functions for the particular wireless interface used for that cell 202 (also referred to here as the "upper LAYER-1 functions"). Each of the radio points 206 serving that cell 202 perform the LAYER-1 functions not performed by the baseband controller 204 (also referred to here as the "lower LAYER-1 functions") as well as implementing the analog RF transceiver functions.

Different splits in the wireless-interface functions between each baseband controller 204 and the radio points 206 can be used. For example, the functional split used for downlink communications (that is, communications transmitted to the UEs 210) can differ from the functional split used for uplink communications (that is, communications received from the UEs 210). Also, for a given direction (downlink or uplink), the same functional split does not need to be used for all front-haul data communicated in that direction. For example, different functional splits can be used for different channels or different resource blocks.

Each radio point 206 comprises one or more radio frequency (RF) modules 216. Each RF module 216 comprises special-purpose hardware (circuitry) that implements the RF transceiver functions for the wireless interface used for communicating with the UEs 210 using a particular carrier. Each RF modules also interfaces the RP module 216 (and the RP 206) to the one or more antennas 208 used with that particular carrier.

In this exemplary embodiment, each radio point 206 is implemented using special-purpose hardware that comprises a multi-core general purpose processor and programmable logic (such as a field-programmable gate array (FPGA)). In this embodiment, each radio point 206 implements some of the lower LAYER-1 functions 218 for the particular wireless interfaces used for communicating with UEs 210. The lower LAYER-1 functions 218, in this embodiment, are implemented using the programmable logic in the radio point 206. Also, in this embodiment, each radio point 206 implements a timing client 220 to synchronize its clock to the master clock for the C-RAN 200. The timing client 220, in this embodiment, is implemented in software executed by the general-purpose processor in the radio point 206.

In the exemplary embodiment shown in FIG. 2, at least some of the RPs 206 are implemented as multi-carrier radio points. The C-RAN 200 can be implemented using only single-carrier radio points, only multi-carrier radio points, or both single-carrier radio points and multi-carrier radio points. Also, any given cell 202 can be served by only single-carrier radio points, only multi-carrier radio points, or both single-carrier radio points and multi-carrier radio points.

Each multi-carrier radio point comprises multiple RF modules 216 and is configured to serve multiple cells 202 using multiple carriers, possibly using multiple wireless interfaces or protocols, in a flexible and dynamic manner. Typically, each multi-carrier radio point is homed to a separate baseband controller 204 for each cell 202 that it serves (and each carrier used to server that cell 202).

Figure 1:
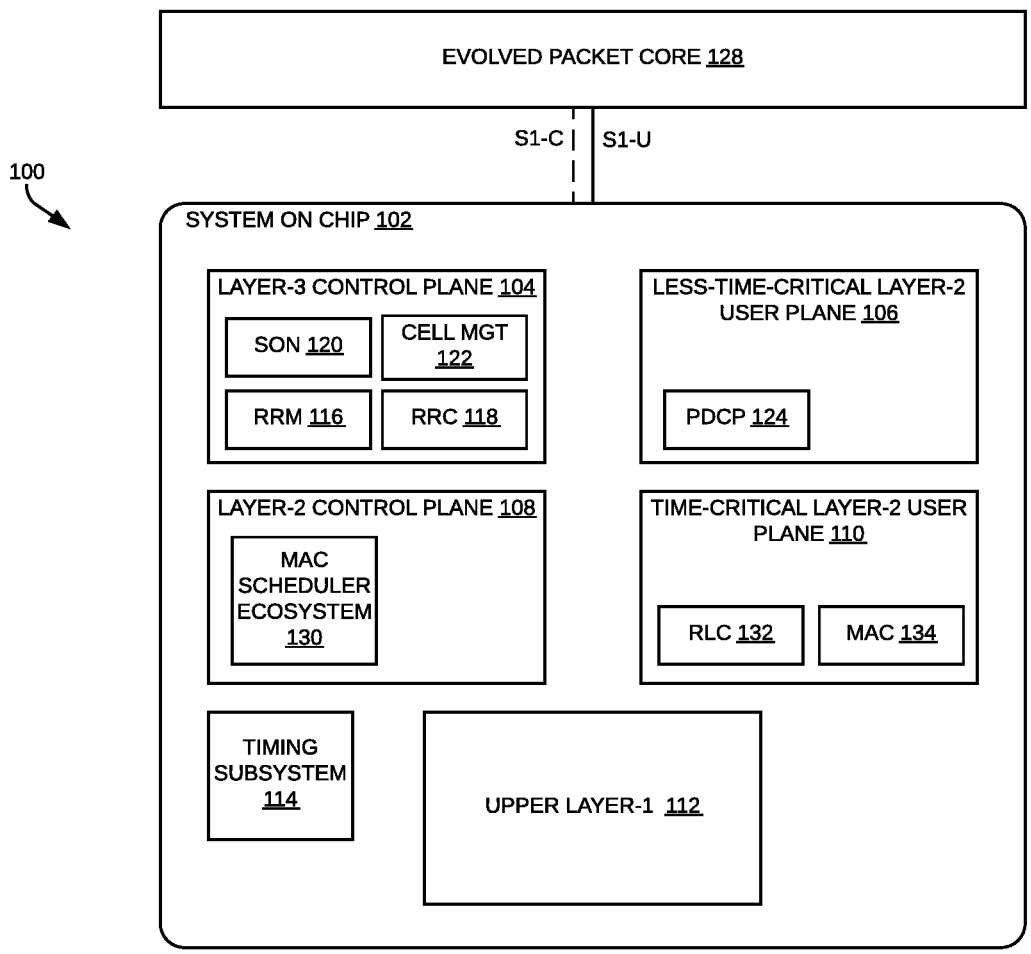
FIG. 1 illustrates the functional partitioning of baseband controller functionality and mapping to various subsystems of a SoC.
Figure 3:
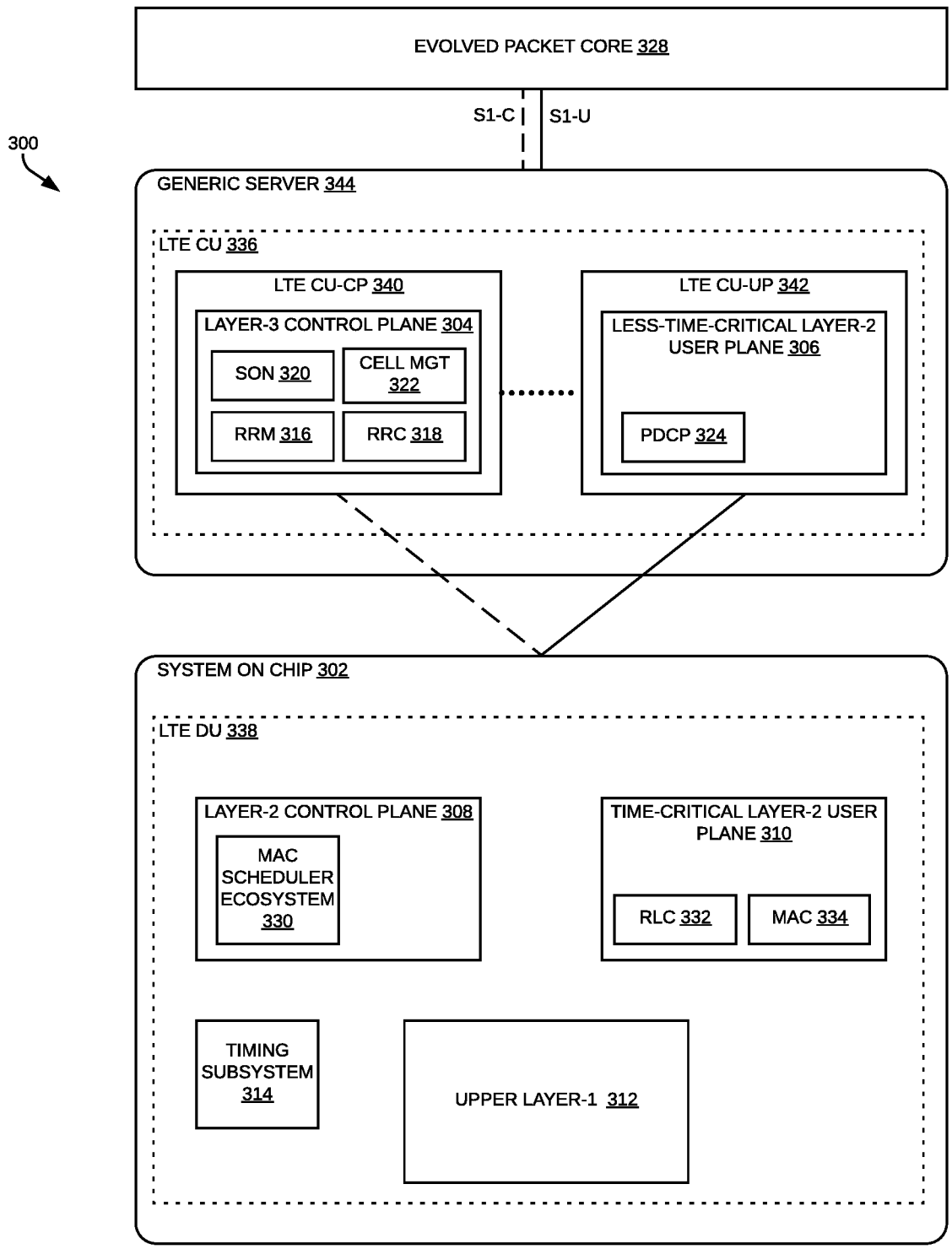
FIGS. 3-5 show three stages of migrating a LTE baseband controller originally implemented using only special-purpose hardware to a final implementation using only virtual platforms.
Figure 4:
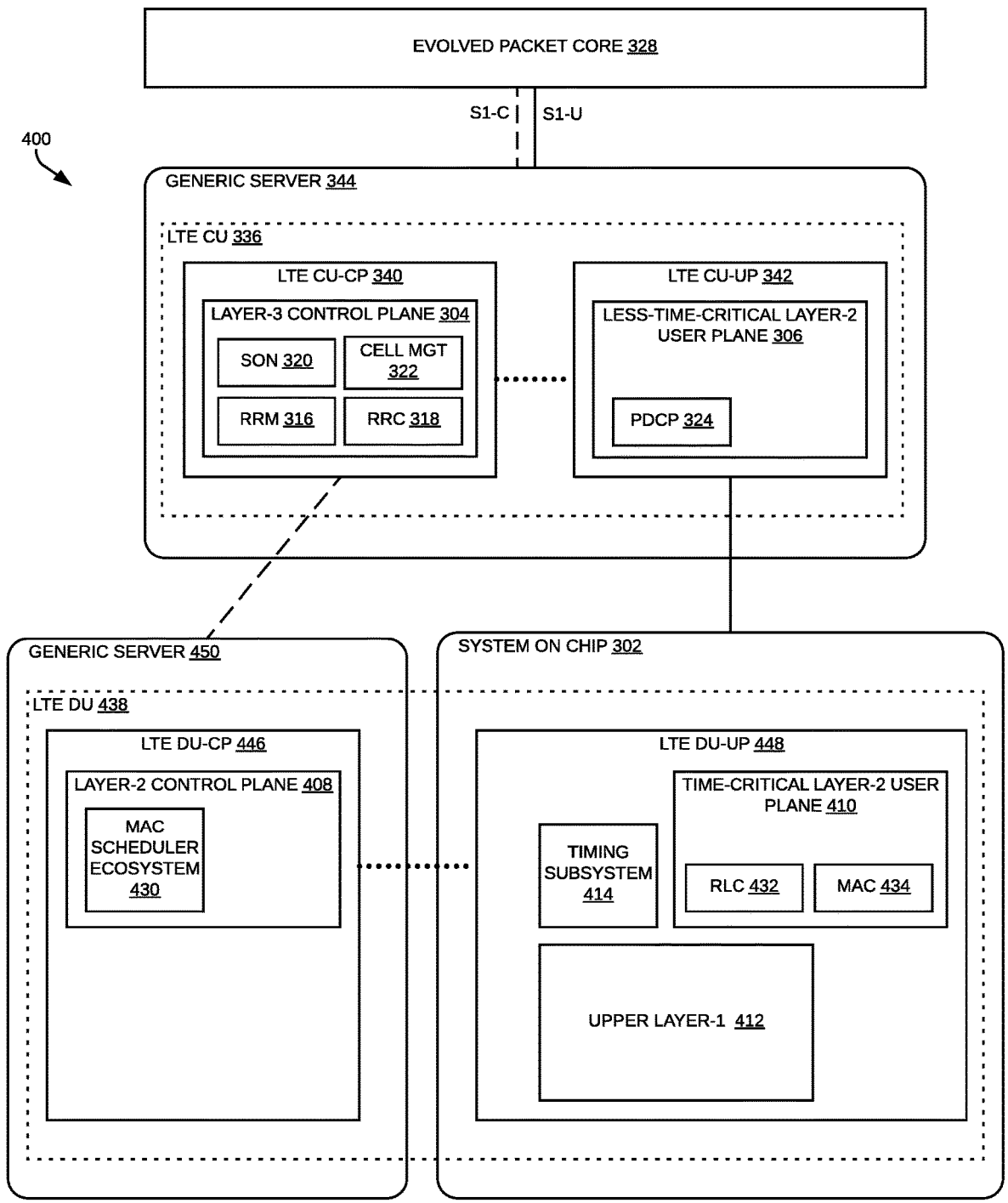
Figure 5:
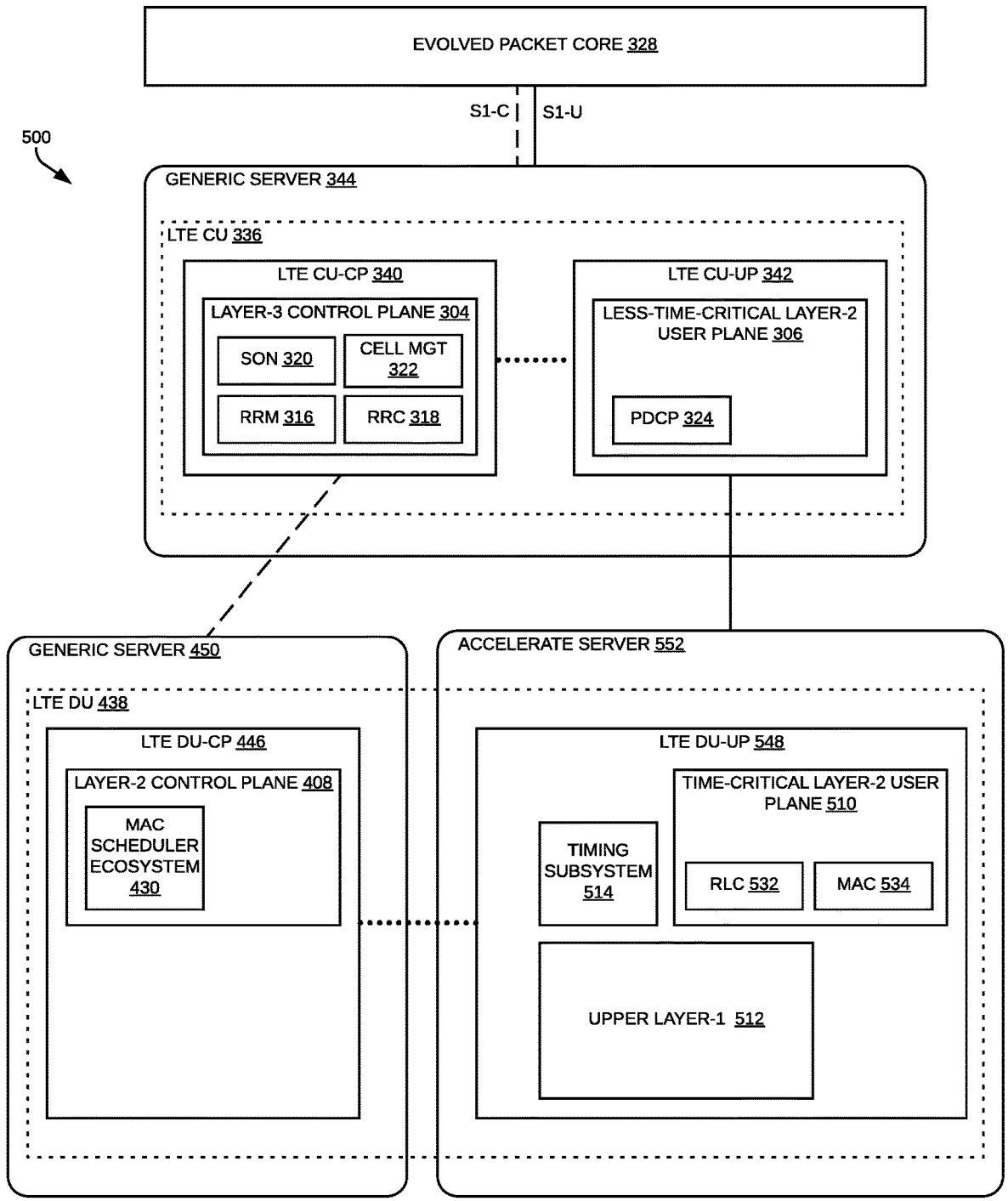

FIGS. 3-5 show three stages of migrating a LTE baseband controller originally implemented using only special-purpose hardware (as shown in FIG. 1) to a final implementation using only virtual platforms (as shown in FIG. 5).

When a function of the baseband controller is implemented using a virtualized platform, that function is implemented in software suitable for execution by a virtual machine instantiated on a generic server or an accelerated server. As used here, a "generic server" refers to a general-purpose server computer (for example, a server computer based on the INTEL x86 platform) that does not include any hardware acceleration units. As used here, an "accelerated server" refers to a general-purpose server computer that includes one or more hardware acceleration units (for example, one of more FPGAs). When instantiated on an accelerated server, the software can make use of hardware acceleration provided by the hardware acceleration units in the accelerated server.

FIG. 3 illustrates one exemplary embodiment of an LTE baseband controller 300 representing a first stage in migrating a baseband controller originally implemented using only special-purpose hardware (as shown in FIG. 1) to a final implementation using only virtual platforms (as shown in FIG. 5).

In the embodiment shown in FIG. 3, the baseband controller 300 is implemented using a "hybrid" virtualized architecture in which some functions of the baseband controller 300 are implemented using a virtual platform and other functions of the baseband controller 300 are implemented using special-purpose hardware.

In this exemplary first-stage embodiment, the functions of the baseband controller 300 are partitioned into a Central Unit (CU) 336 and a Distributed Unit (DU) 338 to align the baseband controller 300 to support 5G standards (which partition the baseband controller into a CU and a DU) in the future.

The CU 336 implements the LTE LAYER-3 Control Plane functions 304 and less-time-critical LTE LAYER-2 User Plane functions 306.

In this first-stage exemplary embodiment, the CU 336 is partitioned into two parts 340 and 342—one of which comprises control plane functions (and is referred to here as the "Central Unit-Control Plane" (CU-CP) 340) and the other of which comprises user plane functions (and is referred to here as the "Central Unit-User Plane" (CU-UP) 342). The CU-CP 340 comprises the LTE LAYER-3 Control Plane functions 304, and the CU-UP 342 comprises the— less time-critical LTE LAYER-3 User Plane functions 306.

The CU-CP 340 and CU-UP 342 are implemented as software for execution by one or more virtual machines instantiated on a generic server 344. In the embodiment shown in FIG. 3, the software for both the CU-CP 340 and CU-UP 342 are deployed together on a single generic server 344, though in other embodiments, they can be deployed on different generic servers 344.

Partitioning the CU 336 into the CU-CP 340 and the CU-UP 342 enables the CU-CP 340 (and the LTE LAYER-3 Control Plane functions 304) and the CU-UP 342 (and the less-time-critical LTE LAYER-2 User Plane functions 306) to be scaled independently of each other. That is, the CU 336 comprises one or more instances of the software implementing the CU-CP 340 that is executed by one or more virtual machines instantiated on one or more generic servers 344 and one or more instances of the software implementing the CU-UP 342 that is executed by one or more virtual machines instantiated on one or more generic servers 344.

In this example, the LTE LAYER-3 Control Plane functions 304 include the LTE RRM functions 316, LTE RRC functions 318, LTE SON functions 320, and LTE Cell Management functions 322. The less-time-critical LAYER-2 User Plane functions 306, in this example, include the LTE PDCP functions 324.

The CU 336 communicate with the wireless service provider's Evolved Packet Core (EPC) 328 using the LTE S1-C and LTE S1-U interfaces, respectively.

In this exemplary first-stage embodiment, the DU 338 implements the LTE LAYER-2 Control Plane functions 308, the time-critical LTE LAYER-2 User Plane functions 310, and the upper LTE LAYER-1 functions 312. In this embodiment, the DU 338 is implemented using special-purpose hardware of the type described above in connection with FIG. 1. In particular, the special-purpose hardware comprises a system-on-chip (SoC) 302 that includes general-purpose processor, a DSP, and one or more application-specific hardware accelerators.

The LTE LAYER-2 Control Plane functions 308, in this example, include the LTE MAC scheduler ecosystem 330. The time-critical LTE LAYER-2 User Plane functions 310, in this example, include the LTE RLC functions 332 and LTE MAC functions 334. The upper LTE LAYER-1 functions 312, in this example, include those LTE LAYER-1 functions not implemented in the radio points.

Also, in the exemplary embodiment shown in FIG. 3, the baseband controller 300 further comprises a timing system 314 that is used to synchronize the other nodes (such as the radio points) in the C-RAN to a master clock. In the exemplary embodiment shown in FIG. 3, the timing system 314 implements the Precision Time Protocol (PTP).

The LTE LAYER-2 Control Plane functions 308 and the time-critical LTE LAYER-2 User Plane functions 310 are mapped to the general-purpose processor of the SoC 302 and are implemented in software that is executed by the general-purpose processor of the SoC 302. Also, in this exemplary embodiment, the timing system 314 is mapped to the general-purpose processor of the SoC 302 and is implemented in software that is executed by the general-purpose processor of the SoC 302.

The upper LTE LAYER-1 functions 312 are mapped to the DSP and the application-specific hardware accelerators of the SoC 302, with some of the upper LTE LAYER-1 functions 312 implemented in software that is executed by the DSP and some upper LAYER-1 functions 312 implemented using the application-specific hardware accelerators in the SoC 302 (under control of the DSP software).

The DU 338 also comprise one or network interfaces (not shown) that couple the DU 338 (and the baseband controller 300 more generally) to the front-haul network or communication links used for communicating with the radio points. For example, where the front-haul network is implemented using a switched ETHERNET network, the DU 338 comprises one or more ETHERNET network interfaces for communicating with the radio points over the front-haul switched ETHERNET network.

The CU-CP 340, CU-UP 342, and DU 338 (and the various functions implemented therein) communicate with each other over a physical network or physical communication links coupling the various hardware implementing the CU-CP 340, CU-UP 342, and DU 338 to each other as needed. For example, these communications can occur over a switched ETHERNET network that is dedicated for communications between the various servers and special-purpose hardware used to implement the baseband controller 300. These communications can also occur over the same switched ETHERNET network that is used for the front-haul network (for example, using one or more virtual local area networks (VLANs) dedicated for such communications). In FIG. 3, control plane communications are illustrated using dashed lines and user plane communications are illustrated using solid lines.

While the approach shown in FIG. 3 provides marginal benefit in scaling the baseband controller 300 to serve increased numbers of UEs, it can serve as a useful first step in the multi-stage process of migrating a baseband controller implemented using only special-purpose hardware to a final implementation using virtual platforms.

This first stage splits off the functions of the upper layers (LTE LAYER-3 Control Plane functions 304 and the less-time-critical LTE LAYER-2 User Plane functions 306) and implements them as a CU 336 as software for execution by one or more virtual machines instantiated on a generic server 344. The other, time-critical functions of the baseband controller 300 comprise, and are referred to as, the DU 338 and can still be implemented using the special-purpose hardware, as was the case with the original special-purpose hardware only implementation.

FIG. 4 illustrates one exemplary embodiment of an LTE baseband controller 400 representing a second stage in migrating a baseband controller originally implemented using only special-purpose hardware (as shown in FIG. 1) to a final implementation using only virtual platforms (as shown in FIG. 5).

In the embodiment shown in FIG. 4, the baseband controller 400 is also implemented using a hybrid virtualized architecture in which some functions of the baseband controller 400 are implemented using a virtual platform and other functions of the baseband controller 400 are implemented using special-purpose hardware.

In the exemplary embodiment shown in FIG. 4, except as described below, the CU 336 is implemented in the same manner as described above in connection with FIG. 3, the description of which is not repeated here for the sake of brevity. Also, the same reference numerals used in FIG. 3 are also used in FIG. 4 to refer to the corresponding elements of the CU 336 shown in FIG. 4.

In the exemplary embodiment shown in FIG. 4, the DU 438 is partitioned into two parts 446 and 448—one of which comprises control plane functions (and is referred to here as the "Distributed Unit-Control Plane" (DU-CP) 446) and the other of which comprises user plane functions (and is referred to here as the "Distributed Unit-User Plane" (DU-UP) 448).

The DU-CP 446 comprises the LTE LAYER-2 Control Plane functions 408, and the DU-UP 448 comprises the time-critical LTE LAYER-2 User Plane functions 410, the upper LTE LAYER-1 functions 412, and the timing subsystem 414.

The DU-CP 446 is implemented using a virtual platform while the DU-UP 448 is implemented using special-purpose hardware in the manner described above in connection with FIG. 3. The functions implemented by the DU-UP 448 are, except as described below, implemented in the same manner as described above in connection with FIG. 3, the description of which is not repeated here for the sake of brevity.

In this exemplary embodiment, the LTE LAYER-2 Control Plane functions 408 include the LTE MAC scheduler ecosystem 430.

The LTE LAYER-2 Control Plane functions 408 are implemented as software that is executed by one or more virtual machines instantiated on a generic server 450. The DU-CP 446 (and the LTE LAYER-2 Control Plane functions 408 including the LTE MAC scheduler ecosystem 430 implemented therein) can be scaled independently of the DU-UP 448.

The CU-CP 340, CU-UP 342, DU-CP 446, and DU-UP 448 (and the various functions implemented therein) communicate with each other over a physical network or physical communication links coupling the various hardware implementing the CU-CP 340, CU-UP 342, DU-CP 446, and DU-UP 448 to each other as needed. For example, these communications can occur over a switched ETHERNET network that is dedicated for communications between the various servers and special-purpose hardware used to implement the baseband controller 400. These communications can also occur over the same switched ETHERNET network that is used for the front-haul network (for example, using one or more VLANs dedicated for such communications). In FIG. 4, control plane communications are illustrated using dashed lines, user plane communications are illustrated using solid lines, and communications between the control plane and user plane are illustrated using dotted lines.

The approach shown in FIG. 4 moves the LTE LAYER-2 Control Plane functions 408 (and the LTE MAC scheduler ecosystem 430 implemented therein) to the virtualized platform, where they can be efficiently scaled in an independent fashion. It should be noted that by moving the LTE LAYER-2 Control Plane functions 408 (and the LTE MAC scheduler ecosystem 430 implemented therein) to the virtualized platform, the general-purpose processor in the SoC 302 may be underutilized (since it no longer is used for the processor-intensive LTE LAYER-2 Control Plane functions 408), which may result in the upper LTE LAYER-1 functions 312 becoming the bottleneck as the number of UEs served by the baseband controller 400 is increased. However, the user plane functions can typically be scaled more easily by replicating hardware (that is, by reconfiguring the baseband controller 400 to support the use of more than one SoC 302).

In general, the approach shown in FIG. 4, provides an upgrade path for baseband controllers 100 and 300 implemented in the manner described above in connection with FIGS. 1 and 3 that are already deployed. This upgrade path still uses the existing special-purpose hardware that is deployed, while providing meaningful improvements in the ability to scale the baseband controller.

FIG. 5 illustrates one exemplary embodiment of an LTE baseband controller 500 representing a third (final) stage in migrating a baseband controller originally implemented using only special-purpose hardware (as shown in FIG. 1) to a final implementation using only virtual platforms (as shown in FIG. 5).

In the exemplary embodiment shown in FIG. 5, except as described below, the CU 336 and is DU-CP 446 are implemented in the same manner as described above in connection with FIG. 4, the description of which is not repeated here for the sake of brevity. Also, the same reference numerals used in FIG. 4 are also used in FIG. 5 to refer to the corresponding elements of the CU 336 and DU-CP 446 shown in FIG. 5.

In the exemplary embodiment shown in FIG. 5, the DU-UP 548 is implemented using a virtual platform. Until commercially available generic servers include sufficient processing power to implement all functions implemented by the DU-UP 548 (in particular, certain operations of the upper LTE LAYER-1 functions 512), the DU-UP 548 is implemented using one or more accelerated servers 552. As noted above, each accelerated server 552 comprises a general-purpose server computer that includes one or more hardware acceleration units (implemented, for example, using one or more FPGAs). The time-critical LTE LAYER-2 User Plane functions 510, the upper LTE LAYER-1 functions 512, and the timing subsystem 514 are implemented as software that is executed by a virtual machine instantiated on the accelerated server 552. In this embodiment, the software implementing the upper LTE LAYER-1 functions 512 makes use of the one or more hardware acceleration units in the accelerated server 552 in order to implement certain operations of the upper LTE LAYER-1 functions 512 (for example, the encoding and decoding).

In general, the approach shown in FIG. 5 may not be suitable for upgrading existing deployed baseband controllers 100, 300, and 400 implemented as described above in FIGS. 1, 3, and 4 since, using current virtualized platform technology, a fully virtualized baseband controller 500 may not provide significant additional processing capacity for the cost since the special-purpose hardware used in the controllers 100, 300, and 400 is fairly economical for the processing capacity it provides. Thus, the approach shown in FIG. 5 is probably better suited for "greenfield" deployments where there are no existing deployed baseband controllers 100, 300, and 400 implemented as described above in FIGS. 1, 3, and 4.

However, the approach shown in FIG. 5 may provide better scalability since using fully virtualized platforms may use less space and fewer physical units, which may make it easier to manage a given deployment. Also, the approach shown in FIG. 5 may be suitable when the particular model of special-purpose hardware used to implement a baseband controller 100, 300, and 400 as described above in FIGS. 1, 3, and 4 reaches its end of life and is no longer commercially available or supported. Moreover, in dual radio access technology (RAT) deployments, the fully virtualized approach shown in FIG. 5 may be somewhat better suited for one RAT (for example, for 5G when no special-purpose hardware may be available) while a hybrid virtualized approach such as the ones shown in FIGS. 3 and 4 may be somewhat better suited for the other RAT (for example, LTE where special-purpose hardware may be available and, possibly, already deployed in the wireless operator's network).

Figure 6:
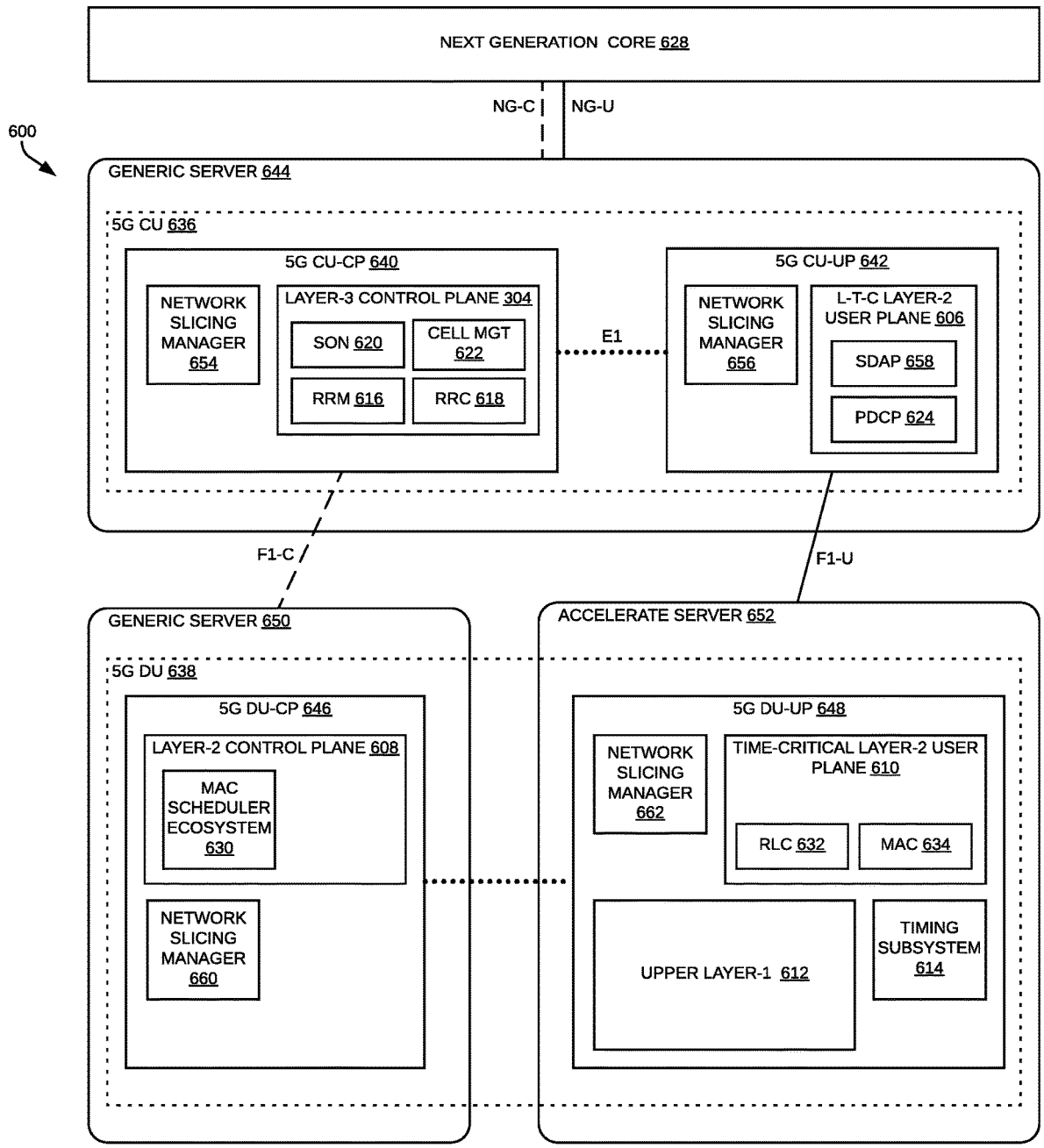
FIG. 6 illustrates one exemplary embodiment of a 5G baseband controller implemented using only virtual platforms.

FIG. 6 illustrates one exemplary embodiment of a 5G baseband controller 600 implemented using only virtual platforms.

As shown in FIG. 6, the baseband controller functionality is partitioned into a 5G Central Unit (CU) 636 and a 5G Distributed Unit (DU) 638.

The CU 636 is further partitioned into two parts—one of which comprises the CU-CP 640 and the other of which comprises the CU-UP 642. The CU-CP 640 comprises the 5G Network Slicing Manager functions 654 for the CU-CP 640 and the 5G LAYER-3 Control Plane functions 604, and the CU-UP 642 comprises the 5G Network Slicing Manager functions 656 for the CU-UP 642 and the less-time-critical (L-T-C) 5G LAYER-2 User Plane functions 606.

In this example, the 5G LAYER-3 Control Plane functions 604 include the 5G RRM functions 616, 5G RRC functions 618, LTE SON functions 620, and 5G Cell Management functions 622.

The less-time-critical 5G LAYER-2 User Plane functions 606, in this example, include the 5G PDCP functions 624, and 5G Service Data Adaptation Protocol (SDAP) functions 658.

The 5G CU-CP 640 and 5G CU-UP 642 are implemented as software for execution by one or more virtual machines instantiated on one or more generic servers 644.

The DU 638 is further partitioned into two parts—one of which comprises the DU-CP 646 and the other of which comprises the DU-UP 648.

The DU-CP 646 comprises the 5G Network Slicing Manager functions 660 for the DU-CP 646 and the 5G LAYER-2 Control Plane functions 608. In this exemplary embodiment, the 5G LAYER-2 Control Plane functions 608 include the 5G MAC scheduler ecosystem 630.

The DU-UP 648 comprises the 5G Network Slicing Manager functions 662 for the DU-UP 648, the time-critical 5G LAYER-2 User Plane functions 610, the upper 5G LAYER-1 functions 612 (that is, the particular 5G LAYER-1 functions implemented in the baseband controller 600), and the timing subsystem 614.

The DU-CP 646 and DU-UP 648 are implemented using virtual platforms. The 5G DU-CP 646 is implemented as software for execution by one or more virtual machines instantiated on one or more generic servers 650.

Until commercially available generic servers include sufficient processing power to implement all of the functions implemented by the DU-UP 648 (including certain operations of the upper 5G LAYER-1 functions 612), the DU-UP 648 is implemented using one or more accelerated servers 652. The 5G Network Slicing Manager functions 662 for the DU-UP 648, the time-critical 5G LAYER-2 User Plane functions 610, the upper 5G LAYER-1 functions 612, and the timing subsystem 614 are implemented as software that is executed by one or more virtual machines instantiated on one or more accelerated servers 652. In this embodiment, the software implementing the upper 5G LAYER-1 functions 612 makes use of the one or more hardware acceleration units in the accelerated server 652 in order to implement some processing intensive functions of the upper 5G LAYER-1 functions 612 (for example, encoding and decoding).

The CU 636 communicate with the wireless service provider's Next Generation Core (NGC) 628 using the 5G NG-C and 5G NG-U interfaces, respectively.

The CU-CP 640 and CU-UP 642 communicate with the DU-CP 646 and DU-UP 648, respectively, using the 5G F1-C interface and the 5G F1-U interface, respectively. The 5G CU-CP 640 communicates with the 5G CU-UP 642 via the 5G E1 (or similar) interface. These communications among the 5G CU-CP 640, 5G CU-UP 642, 5G DU-CP 646, and 5G DU-UP 648 (and among the various functions implemented therein) occur over a physical network or physical communication links coupling the various hardware implementing the 5G CU-CP 640, 5G CU-UP 642, 5G DU-CP 646, and 5G DU-UP 648 to each other as needed. For example, these communications can occur over a switched ETHERNET network that is dedicated for communications between the various servers used to implement the baseband controller 600. These communications can also occur over the same switched ETHERNET network that is used for the front-haul network (for example, using one or more VLANs dedicated for such communications).

The 5G CU-CP 640 and 5G CU-UP 642 can communicate with the control plane and user plane parts, respectively, of Central Units of other 5G base stations using the 5G Xn-C and 5G Xn-U interfaces, respectively.

In FIG. 6, control plane communications are illustrated using dashed lines, user plane communications are illustrated using solid lines, and communications between the control plane and user plane are illustrated using dotted lines.

With this approach, the functions of the 5G CU-CP 640, 5G CU-UP 642, 5G DU-CP 646, and 5G DU-UP 648 can be scaled independently of one another.

The standards bodies have recognized that migration to 5G wireless service will need to be phased and that dual connectivity with 4G should be provided, both for handset compatibility and to mitigate the need to migrate the core network all at once. The standards bodies have promulgated various options for radio access network architectures supporting such dual connectivity. These 5G architectures are also referred to as "Non Stand Alone (NSA) Architectures," whereas architectures that only provide 5G wireless service are referred to as "Stand Alone (SA) Architectures."

Figure 7:
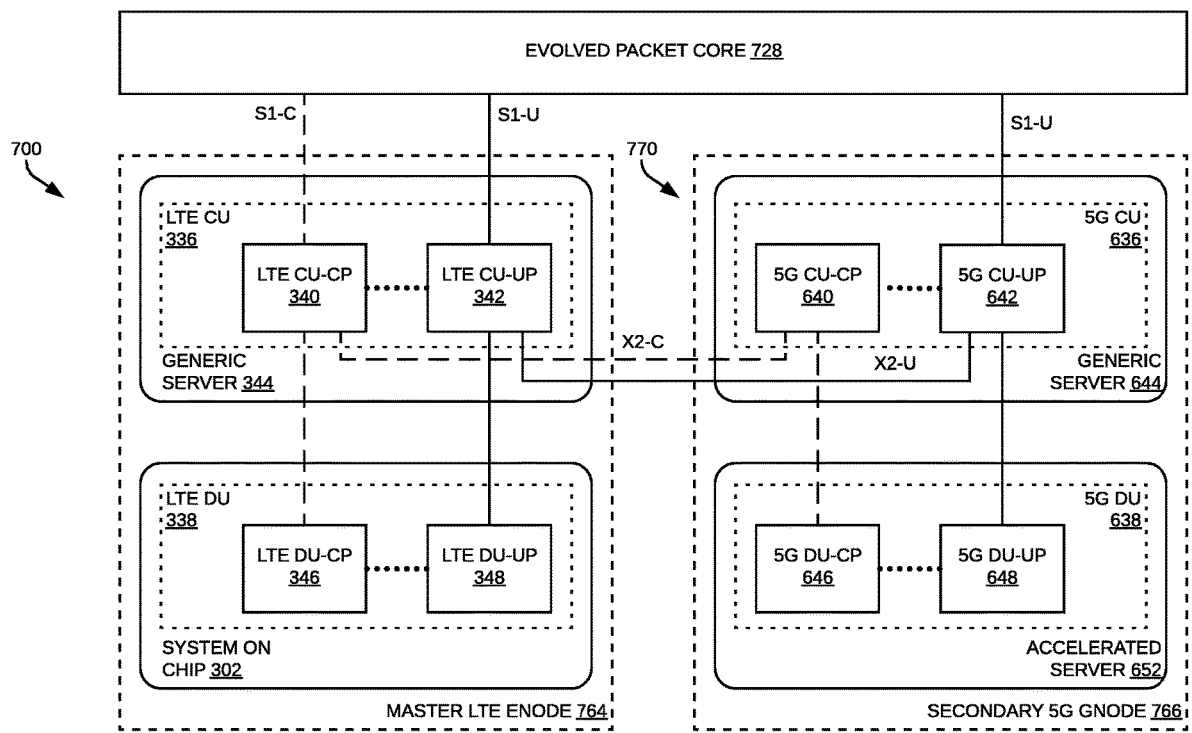
FIGS. 7-9 illustrate various approaches to implementing baseband controller functionality to support dual LTE and 5G connectivity in a C-RAN.
Figure 8:
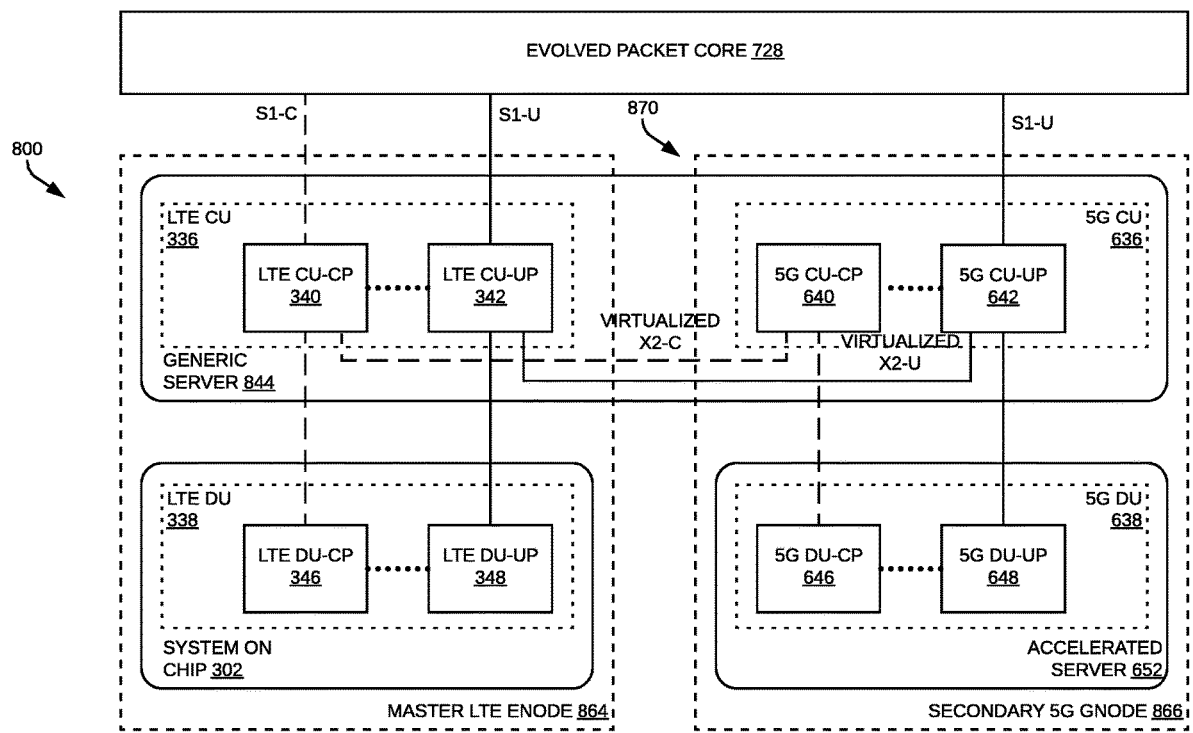
Figure 9:
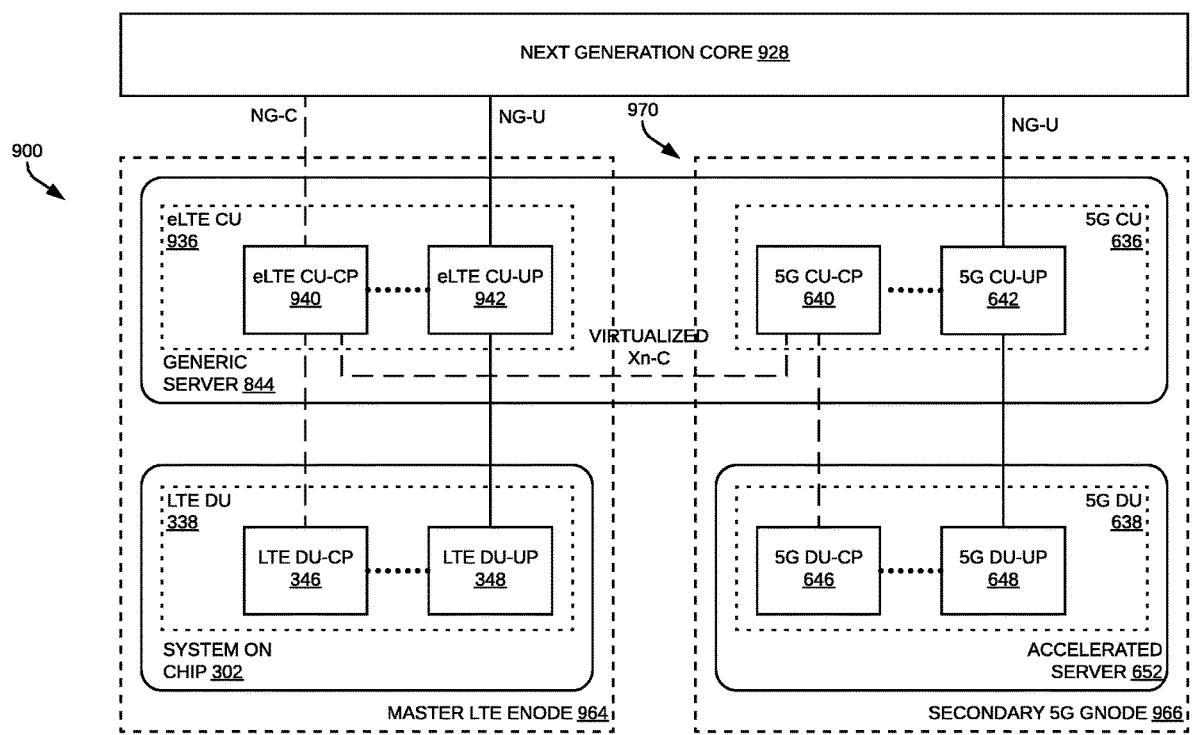

FIGS. 7-9 illustrate various approaches to implementing baseband controller functionality to support dual LTE and 5G connectivity in a C-RAN. The approaches shown in FIGS. 7-9 are described here as being used in the C-RAN 200 shown in FIG. 2.

In all of the embodiments shown in FIG. 7-9, the LTE baseband controller for the LTE eNodeB is implemented using a hybrid virtualized architecture in which the LTE CU (or eLTE CU in the case of the embodiment shown in FIG. 9) is implemented using a virtual platform and the LTE DU is implemented using special-purpose hardware. One of the hybrid virtualized architectures shown in FIGS. 7-9 can be used to upgrade an existing single connectivity LTE deployment that is implemented using only special purpose hardware (as shown in FIG. 1) or using a hybrid virtualized architecture (as shown in FIGS. 3 and 4) to support dual LTE and 5G connectivity in way that leverages the existing deployed special-purpose hardware.

FIG. 7 illustrates one exemplary embodiment of baseband controller functionality that supports dual LTE and 5G connectivity in a C-RAN.

The embodiment shown in FIG. 7 implements one of the options (Option 3x) promulgated by the standard bodies for radio access network architectures that support dual LTE and 5G connectivity.

With Option 3x, the "legacy" 4G Evolved Packet Core (EPC) 728 is used as the core network. Also, two base stations are implemented—an LTE eNodeB 764 and a 5G gNodeB 766. In this example, the LTE eNodeB 764 is implemented using an LTE baseband controller 700 and an associated set of radio points (not shown in FIG. 7), and the 5G gNodeB 768 is implemented using a 5G baseband controller 770 and an associated set of radio points (not shown in FIG. 7). At least some of the radio points served by the LTE eNodeB 764 and the 5G gNodeB 766 can be multi-carrier radio points. Each multi-carrier radio point can be served by both the LTE eNodeB 764 (using one or more carriers supported by the multi-carrier radio point) and the 5G gNodeB 766 (using one or more other carriers supported by that multi-carrier radio point). Also, at least some of the radio points served by the LTE eNodeB 764 and the 5G gNodeB 766 can be single-carrier radio points. Each single-carrier radio point can be served either the LTE eNodeB 764 and the 5G gNodeB 766.

LTE S1-C and S1-U interfaces are established between the EPC 728 and the LTE baseband controller 700, and an LTE S1-U interface is established between the EPC 728 and the 5G baseband controller 770.

In Option 3x, the LTE eNodeB 764 serves as the Master eNodeB (MeNB) and the 5G gNodeB 766 serves as the Secondary gNodeB (SgNB). Control plane communications with the EPC 728 for both LTE and 5G service flow through the LTE eNodeB 764 (and the LTE baseband controller 700). Control plane communications with the EPC 728 for LTE service terminate in the downlink, and originate in the uplink, in the LTE baseband controller 700 directly (that is, without first flowing through another base station). Control plane communications with the EPC 728 for 5G service terminate in the downlink, and originate in the uplink, in the 5G baseband controller 770, where the 5G control plane communications are forwarded between the LTE baseband controller 700 and the 5G baseband controller 770 using an X2-C interface established between the LTE baseband controller 700 and the 5G baseband controller 770.

With Option 3x, 5G UEs use both 5G and LTE radio bearers. User plane communications with the EPC 728 for both the LTE and 5G radio bearers flow through the 5G gNodeB 766 (and the 5G baseband controller 770) via the S1-U interface between the 5G gNodeB 766 and the EPC 728. User plane communications for the LTE radio bearers for 5G UEs are split from and merged with the user plane communications for the 5G radio bearers for 5G UEs at the PDCP function in the 5G baseband controller 770. The other lower functions for the user plane communications for such LTE radio bearers are processed by the LTE eNodeB 764 (and the LTE baseband controller 700). An X2-U interface is established between the LTE baseband controller 700 and the 5G baseband controller 770 so that user plane communications for the LTE radio bearers for 5G UEs can be forwarded between the 5G baseband controller 770 and the LTE baseband controller 700 using the X2-U interface. The user plane communications for 5G radio bearers are processed by the 5G gNodeB 766 (and the 5G baseband controller 770).

With Option 3x, LTE-only (4G) UEs use only LTE radio bearers. User plane communications with the EPC 728 for the LTE radio bearers for LTE-only UEs flow through the LTE eNodeB 764 (and the LTE baseband controller 700) via the S1-U interface established between the LTE eNodeB 764 and the EPC 728. The user plane communications for the LTE radio bearers for LTE-only UEs are processed by the LTE eNodeB 764 (and the LTE baseband controller 700).

In this exemplary embodiment, except as described here in connection with FIG. 7, the LTE CU 336 and LTE DU 338 are implemented in the same manner as described above in connection with FIG. 3, the description of which is not repeated here for the sake of brevity. Also, the same reference numerals used in FIG. 3 are also used in FIG. 7 to refer to the corresponding elements of the LTE CU 336 and LTE DU 338 shown in FIG. 7.

In the embodiment shown in FIG. 7, the software for both the LTE CU-CP 340 and LTE CU-UP 342 are deployed together on a single generic server 344, though in other embodiments, they can be deployed on different generic servers 344. As described above in connection with FIG. 3, the LTE DU 338 in the embodiment shown in FIG. 7 is implemented on special-purpose hardware (a SoC 302 in this example).

In this embodiment, the 5G baseband controller 770 for the 5G gNodeB 766 is implemented using the virtualized architecture described above in connection with FIG. 6, except as described below.

In this exemplary embodiment, except as described here in connection with FIG. 7, the 5G CU 636 and 5G DU 638 are implemented in the same manner as described above in connection with FIG. 6, the description of which is not repeated here for the sake of brevity. Also, the same reference numerals used in FIG. 6 are also used in FIG. 7 to refer to the corresponding elements of the 5G CU 636 and 5G DU 638 shown in FIG. 7.

In the embodiment shown in FIG. 7, the software for both the 5G CU-CP 640 and 5G CU-UP 642 are deployed together on a single generic server 644, though in other embodiments, they can be deployed on different generic servers 644.

In the embodiment shown in FIG. 7, the 5G DU-CP 646 and 5G DU-UP 648 are not deployed on different hardware. Instead, in this embodiment, the software that implements both the 5G DU-CP 646 and 5G DU-UP 648 are implemented together, though in other embodiments, they can be deployed on different hardware as described above in connection with FIG. 6.

In the embodiment shown in FIG. 7, the LTE baseband controller 700 and the 5G baseband controller 770 are implemented completely separately using no shared hardware. As a result, the forwarding of 5G control plane and user plane communications between the LTE baseband controller 700 and the 5G baseband controller 770 over the X2-C and X2-U interfaces occurs over a physical network or physical communication links communicatively coupling the LTE baseband controller 700 and the 5G baseband controller 770 to each other. For example, these communications can occur over a switched ETHERNET network that is dedicated for communications between the LTE baseband controller 700 and the 5G baseband controller 770. These communications can also occur over the same switched ETHERNET network that is used for the front-haul network (for example, using one or more VLANs dedicated for such communications).

FIG. 8 illustrates another exemplary embodiment of baseband controller functionality that supports dual LTE and 5G connectivity in a C-RAN.

The embodiment shown in FIG. 8 also implements the Option 3x dual LTE and 5G connectivity radio access network architecture.

In this exemplary embodiment, except as described here in connection with FIG. 8, the LTE eNodeB 864, baseband controller 800, 5G gNodeB 866, and 5G baseband controller 870 are implemented in the same manner as described above in connection with FIG. 7, the description of which is not repeated here for the sake of brevity. Also, the same reference numerals used in FIG. 7 are also used in FIG. 8 to refer to the corresponding elements of the LTE eNodeB 864, baseband controller 800, 5G gNodeB 866, and 5G baseband controller 870 shown in FIG. 7.

In the example shown in FIG. 8, all of the CU functions for both the LTE baseband controller 800 and 5G baseband controller 870 are implemented on the same virtual platform. That is, in this example, the LTE CU-CP 340, LTE CU-UP 342, 5G CU-CP 640, and 5G CU-UP 642 are deployed together on a single generic server 844. This may make it easier to manage the overall deployment of the LTE baseband controller 800 and 5G baseband controller 870.

As a result of implementing all of the CU functions for both the LTE baseband controller 800 and 5G baseband controller 870 on a single generic server 844, the X2-C and X2-U interfaces used for forwarding of 5G control plane and user plane communications between the LTE baseband controller 800 and the 5G baseband controller 870 (that is, between the LTE CU-CP 340 and the 5G CU-CP 640) can be "virtualized." That is, the X2-C and X2-U interfaces is not implemented using a physical network or physical communication links that are external to the generic server 844 on which the LTE CU-CP 340 and the 5G CU-CP 640 are deployed but instead is implemented internally within that single generic server 844.

Moreover, if the LTE CU 336 and 5G CU 636 are both virtualized, an appropriate Virtualized Network Function (VNF) including both the virtualized LTE CU 336 and 5G CU 636 can be defined in accordance with the Network Function Virtualization standards promulgated by the European Telecommunications Standards Institute (ETSI). If such a VNF is deployed on a common physical Network Function Virtualization Infrastructure (NFVI), the X2-C and X2-U interfaces can be virtualized and implemented internal to the physical NFVI as shown in FIG. 8 and need not use any external (physical) ports for those interfaces.

The LTE baseband controller and the 5G baseband controller can be configured to determine how the CU functionality is deployed (for example, if it is deployed on different servers 344 and 644 as shown in FIG. 7 or on the same server 844 as shown in FIG. 8) and then establish and configure appropriate X2-C and X2-U interfaces between the LTE CU-CP 340 and 5G CU-CP 640 (for example, "physical" X2-C and X2-U interfaces as shown in FIG. 7 or "virtualized" X2-C and X2-U interfaces as shown in FIG. 8).

In the embodiments shown in FIGS. 7-8, X2-C and X2-U interfaces are established between the LTE baseband controller 700 and the 5G baseband controller 770. The embodiments shown in FIGS. 7-8 can be modified in order to implement another option (Option 3a) promulgated by the standard bodies for radio access network architectures that support dual LTE and 5G connectivity. In these modified embodiments that use Option 3a, only an X2-C interface is established between the LTE baseband controller 700 and the 5G baseband controller 770, and an X2-U interface is not established. In these modified embodiments that use Option 3a, user plane communications for LTE radio bearers for both 5G UEs and LTE-only UEs flow directly between the EPC 728 and the LTE baseband controller 700, without flowing through the 5G baseband controller 770 (as is the case for user plane communications for LTE radio bearers for 5G UEs in the Option 3x embodiments).

FIG. 9 illustrates another exemplary embodiment of baseband controller functionality that supports dual LTE and 5G connectivity in a C-RAN.

The embodiment shown in FIG. 9 implements a different option (Option 7a) promulgated by the standard bodies for a dual LTE and 5G radio access network architecture.

In this exemplary embodiment, except as described here in connection with FIG. 9, the LTE eNodeB 964, LTE baseband controller 900, 5G gNodeB 966, and 5G baseband controller 970 are implemented in the same manner as described above in connection with FIG. 8, the description of which is not repeated here for the sake of brevity. Also, the same reference numerals used in FIG. 8 are also used in FIG. 9 to refer to the corresponding elements of the LTE eNodeB 964, LTE baseband controller 900, 5G gNodeB 966, and 5G baseband controller 970 shown in FIG. 9.

In the embodiment shown in FIG. 9, a 5G Next Generation Core (NGC) 928 network is used as the core network. 5G NU-C and 5G NG-U interfaces are established between the NGC 928 and the LTE baseband controller 900, and a 5G-NG-U interface is established between the NGC 928 and the 5G baseband controller 970. As a result, the CU functions for both the LTE baseband controller 900 and 5G baseband controller 970 are configured to interact with the NGC 928. In particular, the CU 936 for the LTE baseband controller 900 is implemented as an "enhanced LTE" (eLTE) Central Unit 936 that is configured to interact with the NGC 928. Thus, the CU-CP 940 and CU-UP 942 for the LTE baseband controller 900 are referred to here as an "eLTE" CU-CP 940 and an "eLTE" CU-UP 942, respectively.

The embodiments shown in FIGS. 8-9 can be used with a phased deployment of 5G service in which a wireless service initially uses its LTE EPC as the core network for the dual LTE and 5G connectivity RAN as shown in FIG. 8 and then later upgrades its core network to a 5G NGC as shown in FIG. 9. During the initial stage when the LTE EPC is used, the CU for the LTE baseband controller is implemented in an LTE CU 836 as described above in connection with FIG. 8. Then, when the core network is upgraded to a 5G NGC, the software implementing the CU for the LTE baseband controller can be upgraded to implement an eLTE CU 936 as described above in connection with FIG. 9. This would involve a software upgrade, where the same baseband controller hardware that was used with the LTE EPC could continue to be used with the 5G NGC (with the upgraded eLTE CU software) after the core network is updated to the 5G NGC.

The 3rd Generation Partnership Project (3GPP) Release 12 introduced the concept of dual connectivity using solely LTE service.

Figure 10:
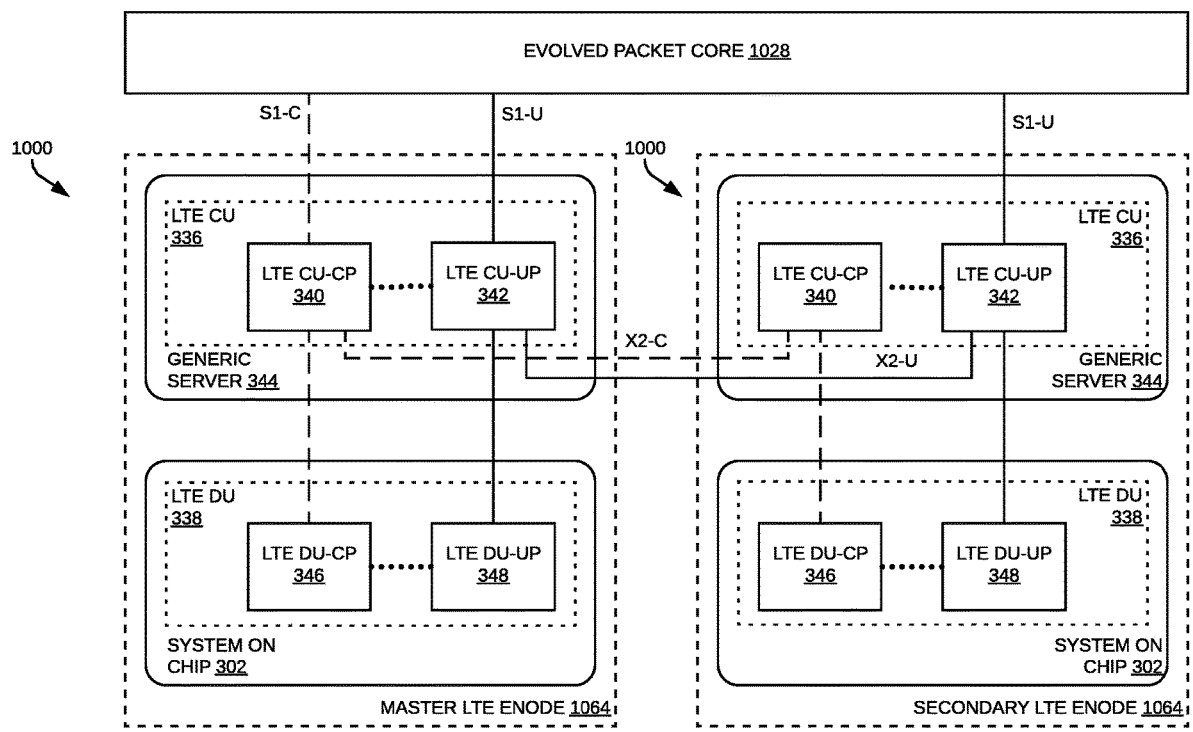
FIGS. 10-11 illustrate various approaches to implementing baseband controller functionality to support LTE dual connectivity in a C-RAN.
Figure 11:
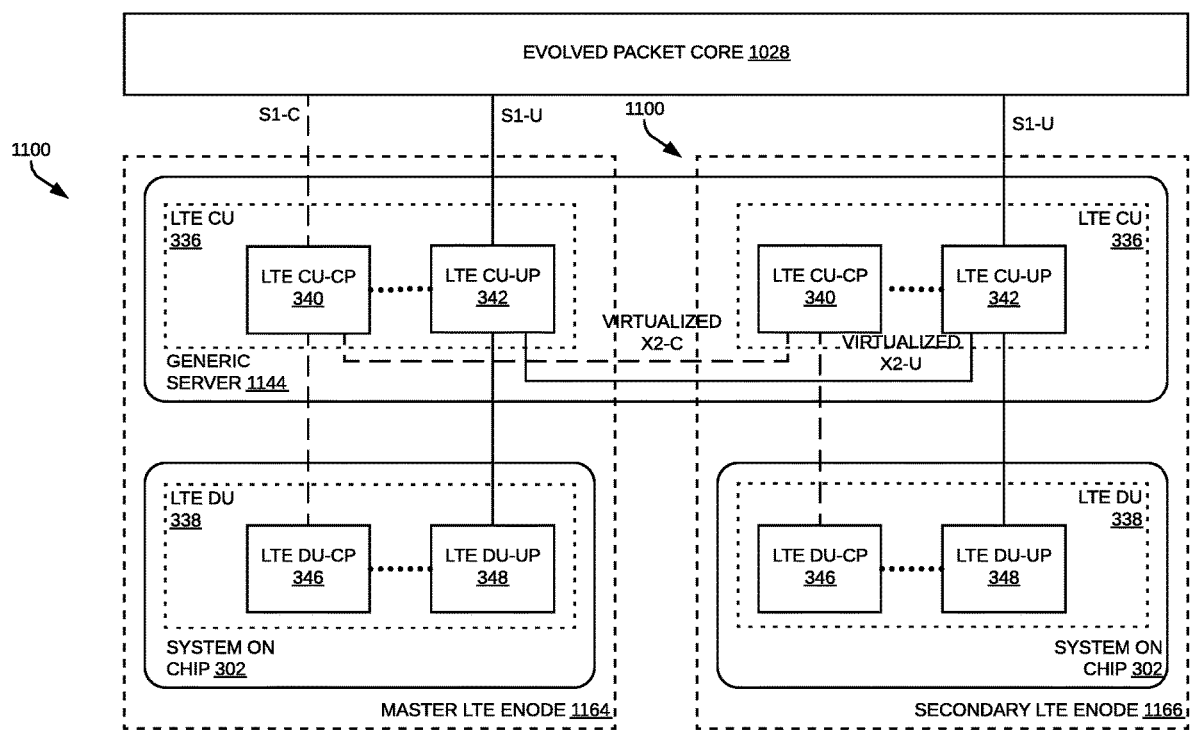

FIGS. 10-11 illustrate various approaches to implementing baseband controller functionality to support LTE dual connectivity in a C-RAN. The approaches shown in FIGS. 10-11 are described here as being used in the C-RAN 200 shown in FIG. 2.

In the embodiments shown in FIG. 10-11, the LTE baseband controller for each LTE eNodeB is implemented using a hybrid virtualized architecture in which the LTE CU is implemented using a virtual platform and the LTE DU is implemented using special-purpose hardware. By using one of the hybrid virtualized architectures shown in FIGS. 10-11, an existing single connectivity LTE deployment that is implemented using only special purpose hardware (as shown in FIG. 1) or using a hybrid virtualized architecture (as shown in FIGS. 3 and 4) can be upgraded to support LTE dual connectivity in way that leverages the existing deployed special-purpose hardware.

In the embodiment shown in FIG. 10, LTE dual connectivity is provided using two LTE eNodeBs 1064. In this example, each LTE eNodeB 1064 is implemented using an LTE baseband controller 1000 and an associated set of radio points (not shown in FIG. 10). As noted above, at least some of the radio points served by each LTE eNodeB 1064 can be multi-carrier radio points. Each multi-carrier radio point can be served by both LTE eNodeBs 1064 (using one or more carriers supported by the multi-carrier radio point). Also, at least some of the radio points served by the LTE eNodeBs 1064 can be single-carrier radio points. Each single-carrier radio point can be served by either of the LTE eNodeBs 1064.

An approach similar to the one used in the embodiment shown in FIG. 7 is used with the embodiment shown in FIG. 10. In this embodiment, one of the LTE eNodeBs 1064 serves as the Master eNodeB (MeNB) and the other LTE eNodeB 1064 serves as the Secondary eNodeB (SeNB). Control plane communications with the EPC 1028 for both LTE eNodeBs 1064 flow through the Master eNodeB 1064 (and the associated LTE baseband controller 1000). Control plane communications with the EPC 1028 for the Master eNodeB 1064 terminate in the downlink, and originate in the uplink, in the associated LTE baseband controller 1000 directly (that is, without first flowing through another base station). Control plane communications with the EPC 1028 for the Secondary eNodeB 1064 terminate in the downlink, and originate in the uplink, in the associated LTE baseband controller 1000, where the LTE control plane communications are forwarded between the LTE baseband controller 1000 in the Master eNodeB 1064 and the LTE baseband controller 1000 in the Secondary eNodeB 1064 using the LTE X2-C interface.

In this embodiment, user plane communications with the EPC 1028 for the Master eNodeB 1064 terminate in the downlink, and originate in the uplink, in the LTE baseband controller 1000 of the Master eNodeB 1064 directly. Also, user plane communications with the EPC 1028 for the Secondary eNodeB 1064 terminate in the downlink, and originate in the uplink, in the LTE baseband controller 1000 directly (that is, without flowing through the Secondary eNodeB 1064 as is the case for control plane communications for the Secondary eNodeB 1064).

In this exemplary embodiment, except as described here in connection with FIG. 10, the LTE CU 336 and LTE DU 338 in both the Master and Secondary eNodeBs 1064 are implemented in the same manner as described above in connection with FIG. 3, the description of which is not repeated here for the sake of brevity. Also, the same reference numerals used in FIG. 3 are also used in FIG. 10 to refer to the corresponding elements of the LTE CU 336 and LTE DU 338 shown in FIG. 10.

In the embodiment shown in FIG. 10, the software for both the LTE CU-CP 340 and LTE CU-UP 342 for the Master eNodeB 1064 is deployed together on a single generic server 344, though in other embodiments, they can be deployed on different generic servers 344. Likewise, in this embodiment, the software for both the LTE CU-CP 340 and LTE CU-UP 342 for the Secondary eNodeB 1064 is deployed together on a single generic server 344, though in other embodiments, they can be deployed on different generic servers 344. As described above in connection with FIG. 3, the LTE DU 338 for both the Master eNodeB 1064 and Secondary eNodeB 1064 shown in FIG. 10 is implemented on special-purpose hardware (a SoC 302 in this example).

In the embodiment shown in FIG. 10, the LTE baseband controller 1000 of the Master eNodeB 1064 and the LTE baseband controller 1000 of the Secondary eNodeB 1064 are implemented completely separately using no shared hardware. As a result, the forwarding of control plane communications for the Secondary eNodeB 1064 between the LTE baseband controller 1000 of the Master eNodeB 1064 and the LTE baseband controller 1000 of the Secondary eNodeB 1064 over the LTE X2-C interface and the forwarding of user plane communications for the Secondary eNodeB 1064 between the LTE baseband controller 1000 of the Master eNodeB 1064 and the LTE baseband controller 1000 of the Secondary eNodeB 1064 over the LTE X2-u interface occurs over a physical network or physical communication links communicatively coupling the LTE baseband controller 1000 of the Master eNodeB 1064 and the LTE baseband controller 1000 of the Secondary eNodeB 1064 to each other. For example, these communications can occur over a switched ETHERNET network that is dedicated for communications between the LTE baseband controller 1000 of the Master eNodeB 1064 and the LTE baseband controller 1000 of the Secondary eNodeB 1064. These communications can also occur over the same switched ETHERNET network that is used for the front-haul network (for example, using one or more VLANs dedicated for such communications).

FIG. 11 illustrates another exemplary embodiment of baseband controller functionality that supports LTE dual connectivity in a C-RAN.

In this exemplary embodiment, except as described here in connection with FIG. 11, the Master eNodeB 1164 (and the baseband controller 1100 therein) and the Secondary eNodeB 1164 (and the baseband controller 1100 therein) are implemented in the same manner as described above in connection with FIG. 10, the description of which is not repeated here for the sake of brevity. Also, the same reference numerals used in FIG. 10 are also used in FIG. 11 to refer to the corresponding elements of the Master eNodeB 1164 (and the baseband controller 1100 therein) and the Secondary eNodeB 1164 (and the baseband controller 1100 therein) shown in FIG. 11.

An approach similar to the one used in the embodiment shown in FIG. 8 is used with the embodiment shown in FIG. 11.

In the example shown in FIG. 11, all of the CU functions for the LTE baseband controller 1100 in both of the Master and Secondary eNodeBs 1164 are implemented on the same virtual platform. That is, in this example, the LTE CU-CP 340 and LTE CU-UP 342 for both the Master and Secondary eNodeBs 1164 are deployed together on a single generic server 1144. This may make it easier to manage the overall deployment of the LTE baseband controllers 1100.

As a result of implementing all of the CU functions for the LTE baseband controller 1100 in both of the Master and Secondary eNodeBs 1164 on a single generic server 1144, the LTE X2-C and X2-U interfaces used for forwarding LTE control plane and user plane communications between the LTE baseband controller 1100 for the Master eNodeB 1164 and the LTE baseband controller 1100 for the Secondary eNodeB 1164 can be virtualized and implemented internally within the single generic server 1144 on which the LTE CU-CP 340 and LTE CU-UP 342 are deployed.

The LTE baseband controller for the Master and Secondary eNodeBs 1164 can be configured to determine how the CU functionality is deployed (for example, if it is deployed on different servers 344 as shown in FIG. 10 or on the same server 1144 as shown in FIG. 11) and then establish and configure the appropriate X2-C and X2-U interfaces between the LTE CU 336 in the Master and Secondary eNodeBs 1164 (for example, "physical" X2-C and X2-U interfaces as shown in FIG. 10 or "virtualized" X2-C and X2-U interfaces as shown in FIG. 11).

Each baseband controller described above (and the various functions described as being included therein), as well as the system more generally, and any of the specific features described here as being implemented by any of the foregoing, can also be referred to as "circuitry" or a "circuit" that implements that element, function, system, or feature (for example, circuitry or a circuit included in special-purpose hardware or a virtual platform).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 is includes a baseband controller for use with a plurality of radio points to provide wireless service to user equipment (UE) using a wireless interface, the baseband controller comprising: special-purpose hardware configured to implement at least some of the LAYER-1 functions for the wireless interface; and a virtual platform configured to implement some of the functions for the wireless interface.

Example 2 includes the baseband controller of Example 1, wherein the baseband controller is partitioned into a Central Unit (CU) and a Distributed Unit (DU); wherein the CU comprises LAYER-3 control plane functions for the wireless interface and less-time-critical LAYER-2 user plane functions for the wireless interface; wherein the DU comprises LAYER-2 control plane functions for the wireless interface, time-critical LAYER-2 user plane functions for the wireless interface, and the LAYER-1 functions implemented by the baseband controller; wherein the CU is implemented using the virtual platform; and wherein at least some of the DU is implemented using the special-purpose hardware.

Example 3 includes the baseband controller of Example 2, wherein the CU is partitioned into a Central Unit-Control Plane part (CU-CP) and a Central Unit-User Plane part (CU-UP); wherein the CU-CP comprises the LAYER-3 control plane functions; and wherein the CU-UP comprises the less-time-critical LAYER-2 user plane functions.

Example 4 includes the baseband controller of Example 3, wherein the CU-CP and CU-UP can be scaled independently of each other.

Example 5 includes the baseband controller of any of Examples 2-4, wherein the DU is partitioned into a Distributed Unit-Control Plane part (DU-CP) and a Distributed Unit-User Plane part (DU-UP).

Example 6 includes the baseband controller of Example 5, wherein the DU-CP and DU-UP can be scaled independently of each other.

Example 7 includes the baseband controller of any of Examples 5-6, wherein the DU-CP comprises the LAYER-2 control plane functions for the wireless interface; and wherein the DU-UP comprises the time-critical LAYER-2 user plane functions for the wireless interface and the LAYER-1 functions implemented by the baseband controller.

Example 8 includes the baseband controller of any of Examples 5-7, wherein the DU-UP is implemented by the special-purpose hardware.

Example 9 includes the baseband controller of any of Examples 5-8, wherein the DU-CP is implemented by the special-purpose hardware.

Example 10 includes the baseband controller of any of Examples 5-9, wherein the DU-CP is implemented by the virtual platform.

Example 11 includes the baseband controller of any of Examples 1-10, wherein the special-purpose hardware comprises at least one system on a chip (SoC).

Example 12 includes the baseband controller of any of Examples 1-11, wherein the SoC comprises at least one general-purpose processor, at least digital signal processor (DSP), and at least one application-specific hardware accelerator.

Example 13 includes the baseband controller of any of Examples 1-12, wherein the virtual platform comprises at least one of a generic server and an accelerated server, the accelerated server comprises one or more hardware acceleration units.

Example 14 includes the baseband controller of any of Examples 1-13, each of the functions implemented by the virtual platform are implemented at least in part in software executed by one or more virtual machines instantiated on at least one of a generic server and an accelerated server.

Example 15 includes the baseband controller of any of Examples 1-14, wherein the baseband controller is used to implement a dual connectivity architecture comprising a master base station including the baseband controller and a secondary base station including another baseband controller; and wherein control plane communications with a core network for the secondary base station flow through the baseband controller of the master base station.

Example 16 includes the baseband controller of Example 15, wherein the master base station and the secondary base station both server a common radio point, the common radio point comprising a multi-carrier radio point.

Example 17 includes the baseband controller of any of Examples 15-16, wherein the core network comprises one of an evolved packet core (EPC) core network and a next generation core (NGC) core network.

Example 18 includes the baseband controller of any of Examples 15-17, wherein the baseband controller of the master base station and the baseband controller of the secondary base station are both partitioned into a respective Central Unit (CU) and a respective Distributed Unit (DU); and wherein each CU comprises LAYER-3 control plane and less-time-critical LAYER-2 user plane functions for the respective baseband controller.

Example 19 includes the baseband controller of Example 18, wherein the CU for the baseband controller of the master base station is implemented on a first generic server that is physically separate from a second generic server on which the CU for the baseband controller of the secondary base station is implemented; and wherein one or both of the control plane communications and the user plane communications with the core network for the secondary base station flow through the CU of the baseband controller of the master base station using a physical interface.

Example 20 includes the baseband controller of any of Examples 18-19, wherein the CU for the baseband controller of the master base station and the CU for the baseband controller of the secondary base station are both implemented on a generic server; and wherein one or both of the control plane communications and the user plane communications with the core network for the secondary base station flow through the CU of the baseband controller of the master base station using a virtual interface.

Example 21. The baseband controller of any of Examples 15-20, wherein the master base station is configured to use a first radio access technology (RAT) to wirelessly communicate with user equipment and the secondary base station is configured to use a second RAT to wirelessly communicate with user equipment, wherein the first RAT differs from the second RAT.

Example 22 includes the baseband controller of Example 21, wherein the first RAT comprises an LTE RAT and the second RAT comprises a 5G RAT.

Example 23 includes the baseband controller of any of Examples 15-22, wherein the master base station is configured to use a first radio access technology (RAT) to wirelessly communicate with user equipment and the secondary base station is configured to use a second RAT to wirelessly communicate with user equipment, wherein the first RAT is the same as the second RAT.

Example 24 includes the baseband controller of Example 23, wherein the first RAT and second RAT both comprise an LTE RAT.

Example 25 includes a system comprising: a baseband controller to communicatively couple to a core network; and a plurality of radio points to wirelessly transmit and receive radio frequency signals to and from the user equipment using the wireless interface, each of the radio points associated with at least one antenna and located remote from the controller; wherein the baseband controller comprises: special-purpose hardware configured to implement at least some of the LAYER-1 functions for the wireless interface; and a virtual platform configured to implement some of the functions for the wireless interface.

What is claimed is:

1. A baseband controller for use with a plurality of radio points to provide wireless service to user equipment (UE) using a wireless interface, the baseband controller comprising:
    special-purpose hardware comprising at least one system on a chip comprising:
        at least one general-purpose processor; and
        at least one application-specific hardware accelerator that implements at least one of a plurality of functions for the wireless interface; and
        a virtual platform configured to implement the at least one of the plurality of functions for the wireless interface;
    wherein each of the at least one function implemented by the virtual platform are implemented at least in part in instructions executed by one or more virtual machines instantiated on at least one of a generic server and an accelerated server having at least one processor;
    wherein at least one of the plurality of radio points is communicatively coupled to the baseband controller via a switched Ethernet network and is configured to perform at least one of a plurality of LAYER-1 functions.

2. The baseband controller of claim 1, wherein the baseband controller is partitioned into a Central Unit (CU) and a Distributed Unit (DU);
    wherein the CU comprises LAYER-3 control plane functions for the wireless interface and less-time-critical LAYER-2 user plane functions for the wireless interface;
    wherein the DU comprises LAYER-2 control plane functions for the wireless interface, time-critical LAYER-2 user plane functions for the wireless interface, and the LAYER-1 functions implemented by the baseband controller;
    wherein the CU is implemented using the virtual platform; and
    wherein the DU is at least partially implemented using the special-purpose hardware.

3. The baseband controller of claim 2, wherein the CU is partitioned into a Central Unit-Control Plane part (CU-CP) and a Central Unit-User Plane part (CU-UP);
    wherein the CU-CP comprises the LAYER-3 control plane functions; and
    wherein the CU-UP comprises the less-time-critical LAYER-2 user plane functions.

4. The baseband controller of claim 3, wherein the CU-CP and CU-UP can be scaled independently of each other.

5. The baseband controller of claim 2, wherein the DU is partitioned into a Distributed Unit-Control Plane part (DU-CP) and a Distributed Unit-User Plane part (DU-UP).

6. The baseband controller of claim 5, wherein the DU-CP and DU-UP can be scaled independently of each other.

7. The baseband controller of claim 5, wherein the DU-CP comprises the LAYER-2 control plane functions for the wireless interface; and
    wherein the DU-UP comprises the time-critical LAYER-2 user plane functions for the wireless interface and the LAYER-1 functions implemented by the baseband controller.

8. The baseband controller of claim 5, wherein the DU-UP is implemented by the special-purpose hardware.

9. The baseband controller of claim 5, wherein the DU-CP is implemented by the special-purpose hardware.

10. The baseband controller of claim 5, wherein the DU-CP is implemented by the virtual platform.

11. The baseband controller of claim 1, wherein the virtual platform comprises at least one of a generic server and an accelerated server, the accelerated server comprises one or more hardware acceleration units.

12. The baseband controller of claim 1, wherein the baseband controller is used to implement a dual connectivity architecture comprising a master base station including the baseband controller and a secondary base station including another baseband controller; and
wherein control plane communications with a core network for the secondary base station flow through the baseband controller of the master base station.

13. The baseband controller of claim 12, wherein the master base station and the secondary base station both server a common radio point, the common radio point comprising a multi-carrier radio point.

14. The baseband controller of claim 12, wherein the core network comprises one of an evolved packet core (EPC) core network and a next generation core (NGC) core network.

15. The baseband controller of claim 12, wherein the baseband controller of the master base station and the baseband controller of the secondary base station are both partitioned into a respective Central Unit (CU) and a respective Distributed Unit (DU); and
wherein each CU comprises LAYER-3 control plane and less-time-critical LAYER-2 user plane functions for the respective baseband controller.

16. The baseband controller of claim 15, wherein the CU for the baseband controller of the master base station is implemented on a first generic server that is physically separate from a second generic server on which the CU for the baseband controller of the secondary base station is implemented; and
wherein one or both of the control plane communications and the user plane communications with the core network for the secondary base station flow through the CU of the baseband controller of the master base station using a physical interface.

17. The baseband controller of claim 15, wherein the CU for the baseband controller of the master base station and the CU for the baseband controller of the secondary base station are both implemented on a generic server; and
wherein one or both of the control plane communications and the user plane communications with the core network for the secondary base station flow through the CU of the baseband controller of the master base station using a virtual interface.

18. The baseband controller of claim 12, wherein the master base station is configured to use a first radio access technology (RAT) to wirelessly communicate with user equipment and the secondary base station is configured to use a second RAT to wirelessly communicate with user equipment, wherein the first RAT differs from the second RAT.

19. The baseband controller of claim 18, wherein the first RAT comprises an LTE RAT and the second RAT comprises a 5G RAT.

20. The baseband controller of claim 12, wherein the master base station is configured to use a first radio access technology (RAT) to wirelessly communicate with user equipment and the secondary base station is configured to use a second RAT to wirelessly communicate with user equipment, wherein the first RAT is the same as the second RAT.

21. The baseband controller of claim 20, wherein the first RAT and second RAT both comprise an LTE RAT.

22. A system comprising:
a baseband controller to communicatively couple to a core network; and
a plurality of radio points to wirelessly transmit and receive radio frequency signals to and from the user equipment using the wireless interface, each of the radio points associated with at least one antenna and located remote from the controller;
wherein the baseband controller comprises:
special-purpose hardware comprising at least one system on a chip comprising:
at least one general-purpose processor; and
at least one application-specific hardware accelerator that implements at least one of a plurality of functions for the wireless interface; and
a virtual platform configured to implement the at least one of the plurality of functions for the wireless interface;
wherein each of the at least one function implemented by the virtual platform are implemented at least in part in instructions executed by one or more virtual machines instantiated on at least one of a generic server and an accelerated server having at least one processor;
wherein at least one of the plurality of radio points is communicatively coupled to the baseband controller via a switched Ethernet network and is configured to perform at least one of a plurality of LAYER-1 functions.

23. The baseband controller of claim 1, wherein a Distributed Unit (DU) is at least partially implemented using the special-purpose hardware and is communicatively coupled via an Ethernet network to a Central Unit (CU) that is implemented using the virtual platform.

\* \* \* \* \*